(12) United States Patent
Fadell (10) Patent No.: US 7,908,615 B2
(45) Date of Patent: Mar. 15, 2011

(54) TELESCOPIC COMPACTABLE MEMORY DISC ADAPTER

(75) Inventor: Anthony M. Fadell, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 1295 days.

(21) Appl. No.: 11/419,546

(22) Filed: May 22, 2006

(65) Prior Publication Data

US 2007/0271577 A1 Nov. 22, 2007

(51) Int. Cl.
*G11B 7/24* (2006.01)

(52) U.S. Cl. ......................................... 720/720

(58) Field of Classification Search .................. 720/720, 720/745; 40/340
See application file for complete search history.

(56) References Cited

U.S. PATENT DOCUMENTS

2007/0011698 A1* 1/2007 Costantini ..................... 720/720

FOREIGN PATENT DOCUMENTS

EP 883126 A2 * 12/1998

* cited by examiner

*Primary Examiner* — David D Davis
(74) *Attorney, Agent, or Firm* — Beyer Law Group LLP (57) ABSTRACT

A compactable disc adapter having a substrate capable of effectively extending the diameter of a disc having a compacted position and an extended position. The diameter of the compacted substrate is less than the diameter of the disc whereas the diameter of the expanded substrate is greater than the diameter of the disc.

23 Claims, 10 Drawing Sheets

FIG. 1

Prior Art

TELESCOPIC COMPACTABLE MEMORY DISC ADAPTER

BACKGROUND OF THE INVENTION

1. Field of Invention

This invention relates generally to a memory storage device. More specifically, the invention describes a compactable memory storage disc adapter.

2. Description of Related Art

Figure 1:
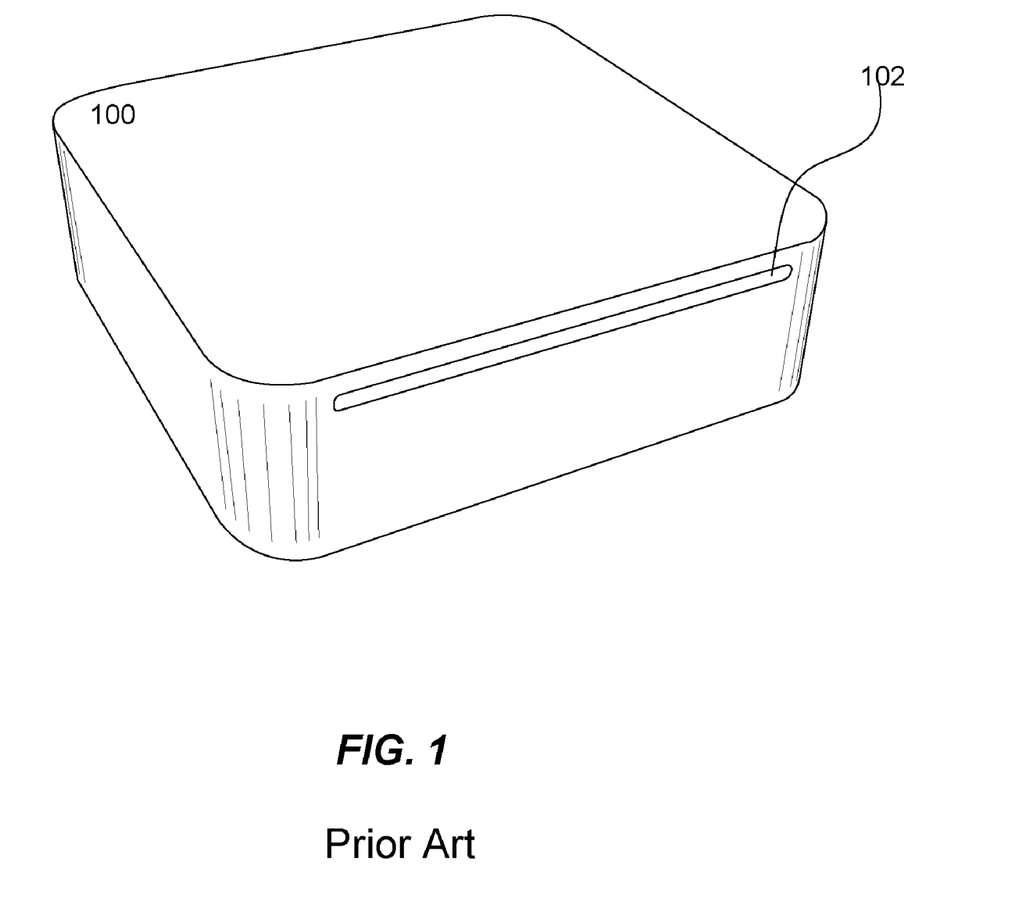
FIG. 1 shows an exemplary memory disc player and slot interface in accordance with an embodiment of the invention.

Rotating memory storage discs have become an important means of data storage. Conventional rotating memory storage discs including compact discs (CDs) and digital versatile discs (DVDs) are produced in standard (i.e. currently 12 cm) and reduced diameter (i.e. currently 8 cm) configurations (with the memory storage capacity being proportional to the disc area). However, only 12 cm memory discs are compatible with currently configured slot drives as seen in FIG. 1 showing a memory disc player 100 having a slot interface 102 suitable for receiving a standard diameter disc. It should be noted that the slot interface 102 can also be found on laptop computers, car audio systems, etc. However, there are many applications requiring less storage capacity than is available on the standard diameter (high storage capacity) disc. In such situations it would be advantageous to use a reduced diameter (lower storage capacity) disc. Such advantages include reduced shipping costs, reduced production costs, etc.

Unfortunately, these reduced diameter discs are not compatible with slot drives exclusively designed to receive standard diameter discs. One currently available solution to using reduced diameter discs in slot drives is that of a rigid adapter that when used in conjunction with the reduced diameter disc enables a memory disc player to accept and play the reduced diameter memory disc. However, this solution does nothing to reduce shipping costs since the rigid adapter (with its larger footprint) must be shipped with the reduced diameter disc and therefore a standard sized shipping container must be used to accommodate both the rigid adapter and reduced diameter disc.

What is needed is a cost effective method and apparatus for shipping reduced diameter discs that assures the end user will be able to use the reduced diameter disc in a slot drive designed exclusively for a standard diameter disc.

SUMMARY OF THE INVENTION

The invention described provides for a cost effective method and apparatus for shipping reduced diameter discs that assures that the end user will be able to use such reduced diameter discs in a slot drive designed exclusively for a standard diameter disc.

In one embodiment, a compactable memory disc adapter is described. In an expanded state, the compactable memory disk adapter can be used to play a reduced diameter memory disc in a slot drive designed exclusively for a standard diameter disc. Alternatively, in a compacted state, the compactable memory disc adapter provides a footprint commensurate with a reduced diameter disc footprint.

In another embodiment, a method of playing a reduced diameter memory disc in a slot interface designed exclusively for a standard diameter memory disc is described. If a memory disc adapter is in a compacted state, then the memory disc adapter is expanded. Once the memory disc adapter is expanded, the reduced diameter memory disc is provided and placed onto the expanded memory disc adapter, and then inserted into the slot interface.

In yet another embodiment, a method of shipping a reduced diameter disc that assures that an end user can play the reduced diameter disc in a slot interface design exclusively for a standard diameter disc is described. A compactable memory disc adapter in a compacted state and a reduced diameter disc are provided. The reduced diameter disc and compacted memory disc adapter are placed in a container having a size commensurate with a reduced diameter disc footprint.

In still another embodiment, a compactable disc adapter includes a substrate capable of effectively extending the diameter of a disc having a compacted position and an extended position. In the compacted position, the substrate has a diameter that is less than the diameter of the disc and in the extended position the substrate diameter is greater than the diameter of the disc.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention will be better understood by reference to the following description taken in conjunction with the accompanying drawings.

DETAILED DESCRIPTION OF SELECTED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

Rotating memory storage discs have become an important means of data storage. Conventional rotating memory storage discs including compact discs (CDs) and digital versatile discs (DVDs) are produced in standard (i.e. currently 12 cm) and reduced diameter (i.e. currently 8 cm) configurations. Unfortunately, these reduced diameter discs are not compatible with slot drives exclusively designed to receive standard diameter discs. One currently available solution is that of a rigid adapter that when used in conjunction with the reduced diameter disc enables a memory disc player to accept the reduced diameter memory disc. However, this solution does nothing to reduce shipping costs since the rigid adapter (with its larger footprint) must be shipped with the reduced diameter disc and therefore a standard sized shipping container must be used to accommodate both the rigid adapter and reduced diameter disc.

Accordingly, the invention described provides for a cost effective method and apparatus for shipping reduced diameter discs that assures that the end user will be able to use such reduced diameter discs in a slot drive designed exclusively for a standard diameter disc. It should be noted that the composition of the adapter can be any suitable material (such as plastic, cardboard, metal, etc.) that can provide sufficient support when cooperating with the reduced diameter disc and inserted in the standard size slot drive.

Figure 2:
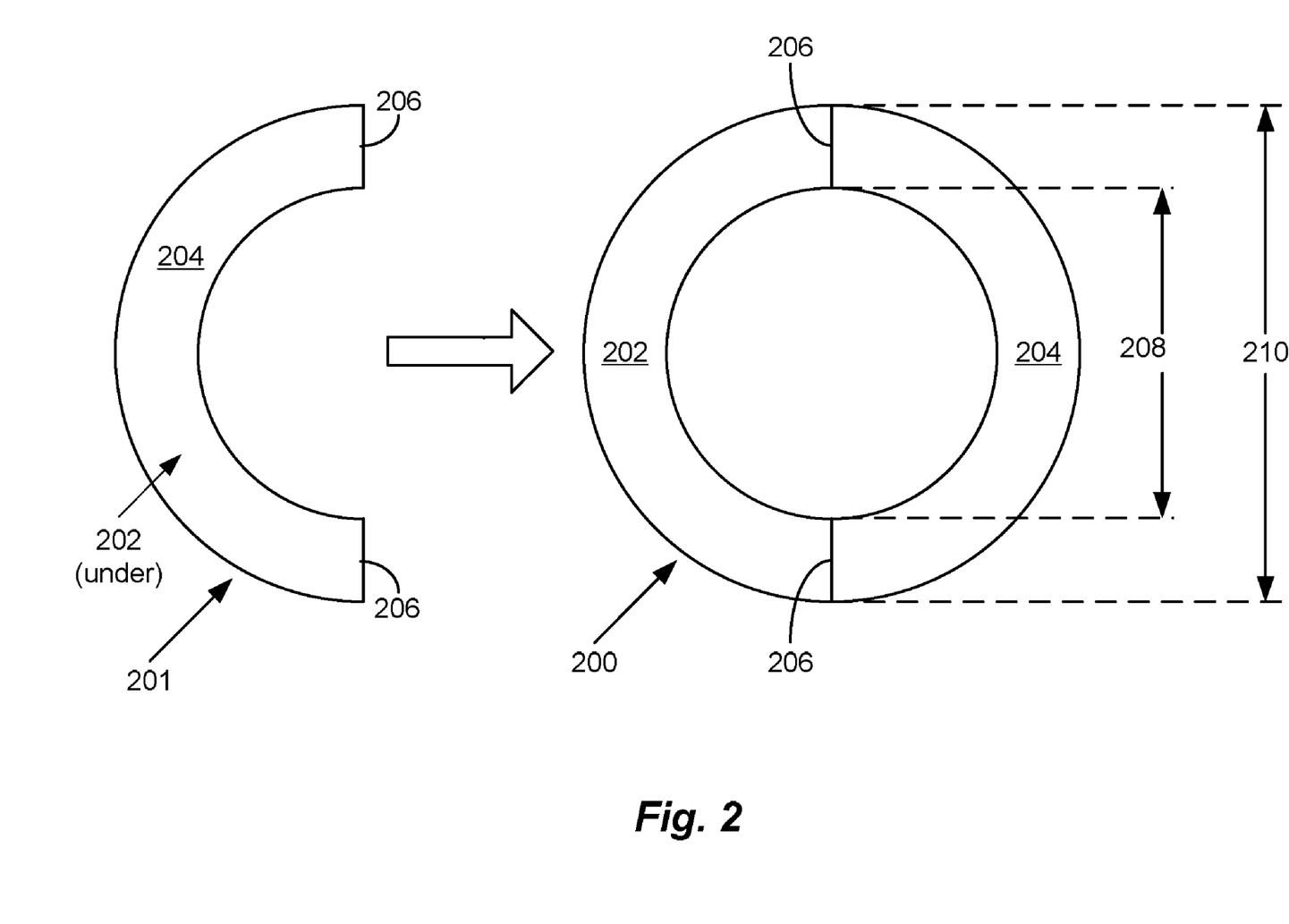
FIG. 2 shows an exemplary compactable memory disc adapter in accordance with an embodiment of the invention in an expanded configuration.

FIG. 2 shows an exemplary compactable memory disc adapter in accordance with an embodiment of the invention in an expanded configuration 200 and a contracted configuration 201. The compactable memory disc adapter includes a first portion 202 and a second portion 204 coupled via joints 206. It should be noted that although two joints are shown, it is contemplated that any number of joints can be used. Once portions 202 and 204 are suitably coupled they form the expanded adapter 200 having an inner diameter 208 and outer diameter 210. The inner diameter 208 is consistent with that of a reduced diameter disc and the outer diameter 210 is consistent with the standard diameter memory disc.

Figure 3:
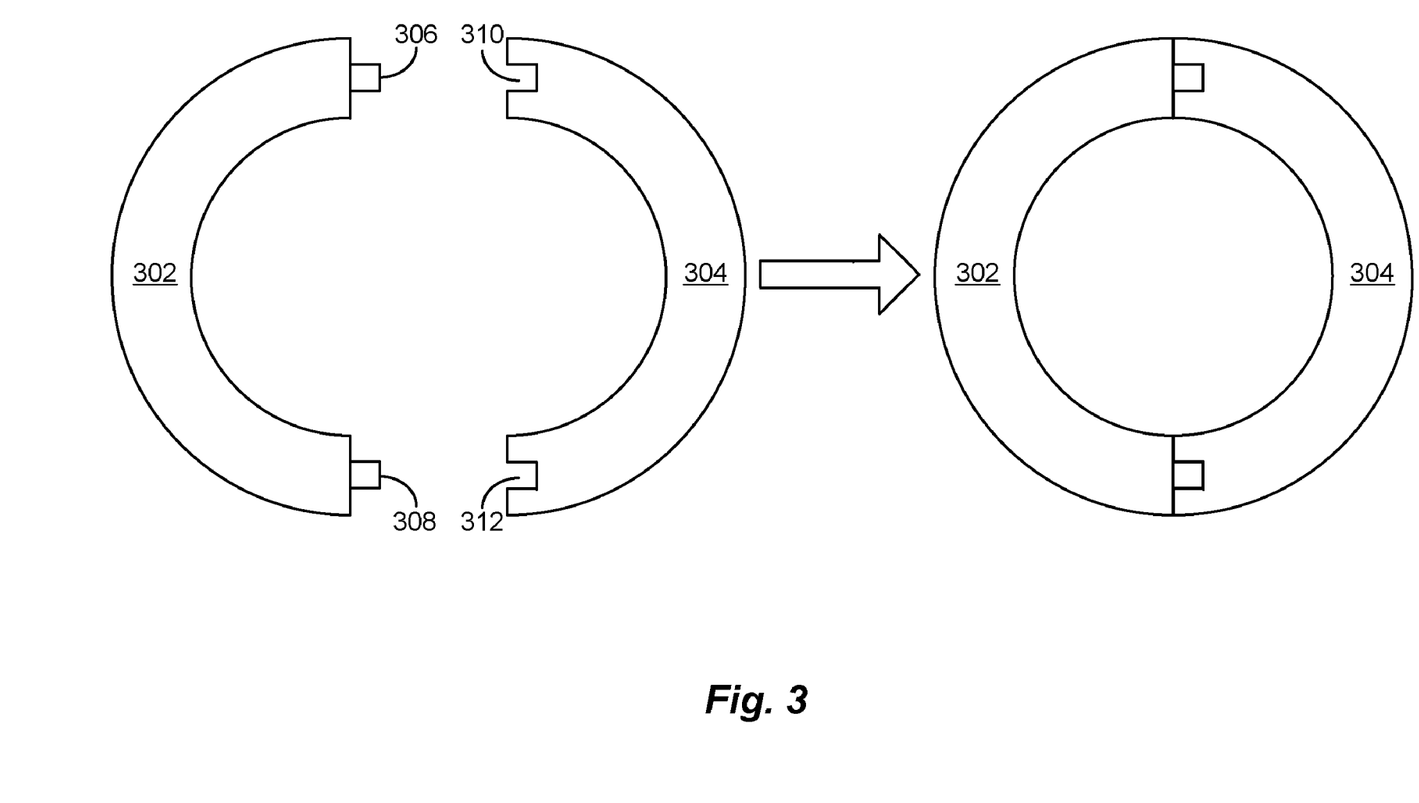
FIG. 3 shows an embodiment of the invention in which two separate halves and are mated together via a locking mechanism.

The compactable memory disc adapter can exist in several different embodiments. FIG. 3 shows one such embodiment in which two separated portions 302 and 304 are mated together via a locking mechanism to form the expanded memory disc adapter 200. For example, such a locking mechanism can include tabs 306 and 308 that when mated with corresponding tab receivers 310 and 312 form the expanded memory disc adapter 200. Again it should be noted that such an embodiment could be implemented with any number of portions and corresponding locking mechanisms along the lines described above. It should be noted that when in a compacted configuration the portions 302 and 304 are stacked one atop the other in such a way as to have a reduced footprint.

Figure 4:
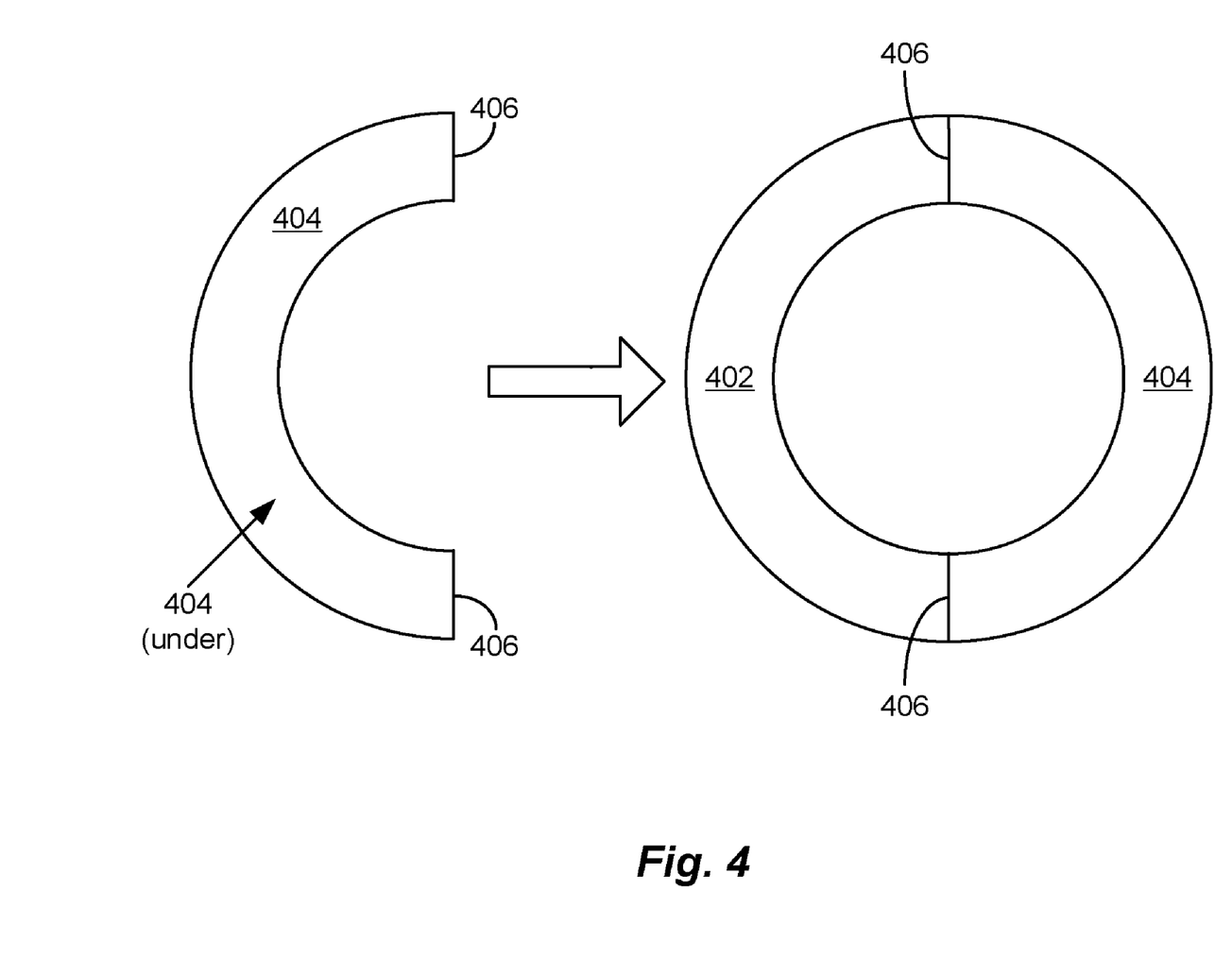
FIG. 4 shows an embodiment of the invention in which two halves are coupled via a hinge.

FIG. 4 shows an embodiment of the memory disc adapter in which portions 402 and 404 are coupled via foldable joints 406. In order to form the expanded memory disc adapter 200, the portions 402 and 404 are folded apart in an unfolding operation using the foldable joints 406. It is contemplated that the unfolding operation can be either a manual unfolding operation whereby the portions 402 and 404 are unfolded by way of an externally applied force or an automatic unfolding operation whereby the portions 402 and 404 are unfolded due to the release of unfolding energy stored in the joints 406. In the automatic unfolding operation, the portions 402 and 404 are (in the compacted configuration) held together in spite of the unfolding energy stored in the joints 406 by way of a clip or other such device (not shown). In order to achieve the expanded configuration, the clip is released and the unfolding energy stored in the joints 406 then forces the portions 402 and 404 apart forming the expanded adapter 200. In order to return to the compacted state, the reverse process is followed whereby an amount of energy commensurate with the unfolding energy previously stored in the foldable joints (by forcing the portions 402 and 406 together) is applied.

Figure 5:
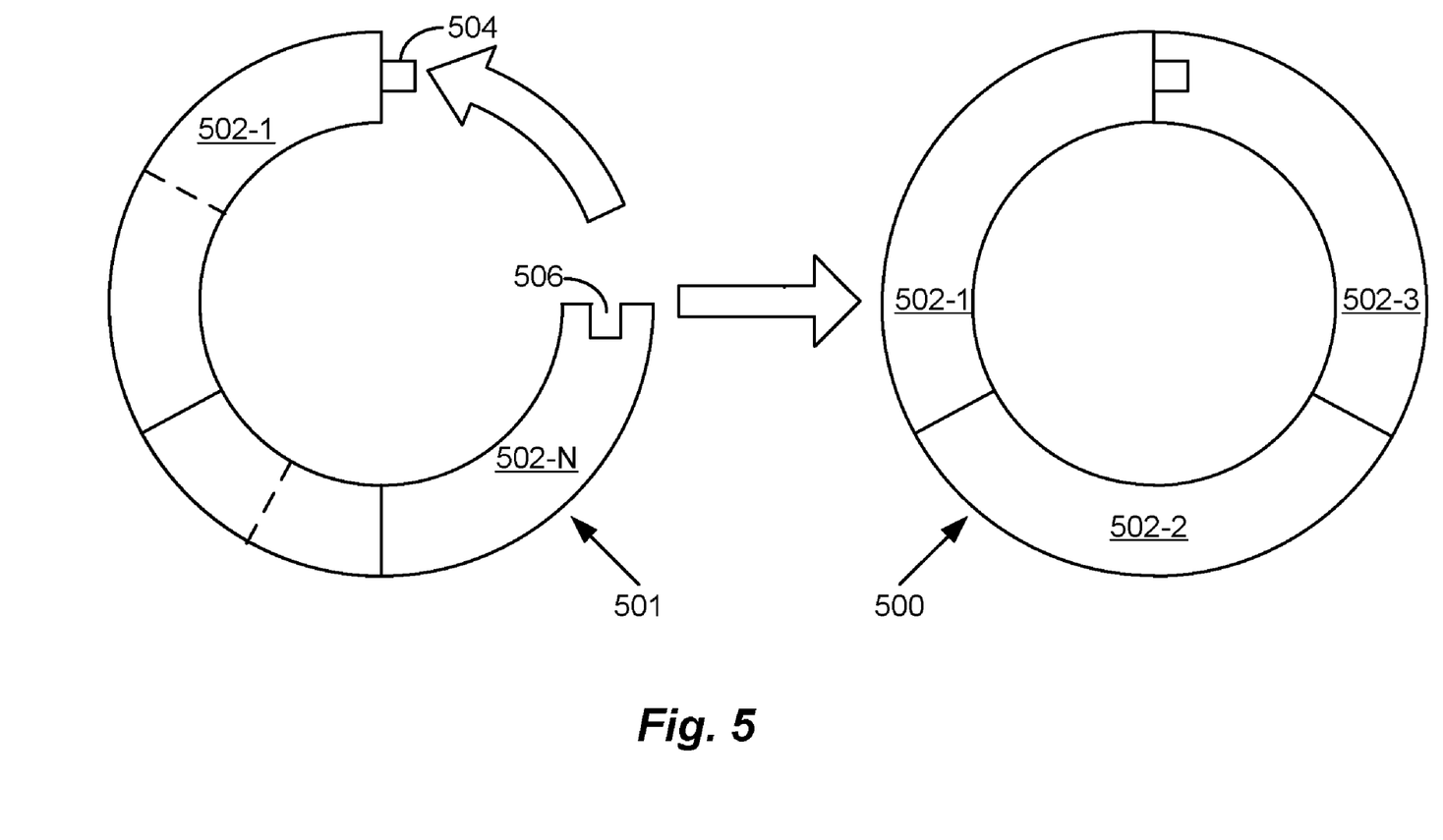
FIG. 5 shows an embodiment of the invention that includes a number of sliding overlapping sections.

FIG. 5 shows a telescopic compactable memory disc adapter in accordance with another embodiment of the invention in an expanded configuration 500 and a compacted configuration 501. As shown in FIG. 5 the telescopic memory disc adapter includes a number of sliding overlapping sections 502-1 through 502-N (where N is the number of sections) that provide for expansion or compaction as required. For example, in the case where N=3, an intermediate section 502-2 immediately adjacent to the sections 502-1 and 502-3 can be telescopically extended from the overlapping section 502-1. Section 502-3 can then be telescopically extended from the section 502-2 and subsequently connected to 502-1 via a locking mechanism. The locking mechanism includes a tab 504 on the section 502-1 and a corresponding tab receiver 506 on the section 502-3.

Figure 6:
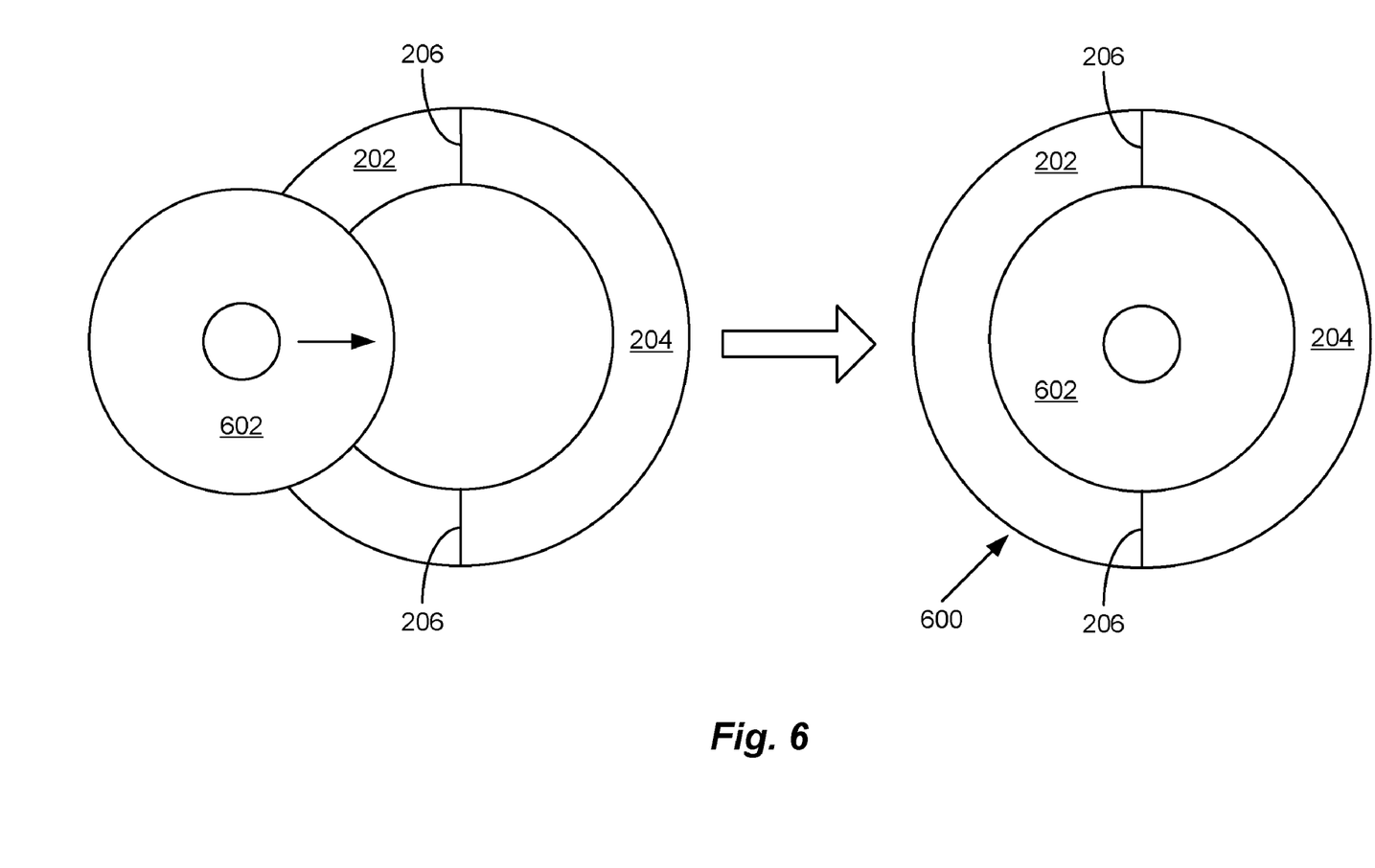
FIG. 6 shows an assembly illustrating the expanded memory disc adapter receiving the reduced diameter disc.

FIG. 6 shows an assembly 600 illustrating the expanded memory disc adapter 200 receiving the reduced diameter disc 602 with outer diameter 208. The disc 602 is placed within the region defined by the diameter 208 and then rigidly connected to the adapter 200. The assembly 600 can then be inserted into the memory disc player 100 by way of the slot 102. In this way the reduced diameter disc 602 can then be played in the memory disc player 100. It should be noted that although shown in terms of the memory disc adapter 200, the assembly 600 can include any appropriate embodiment of the adapter such as that of memory disc adapter 500 shown in FIG. 5.

Figure 7:
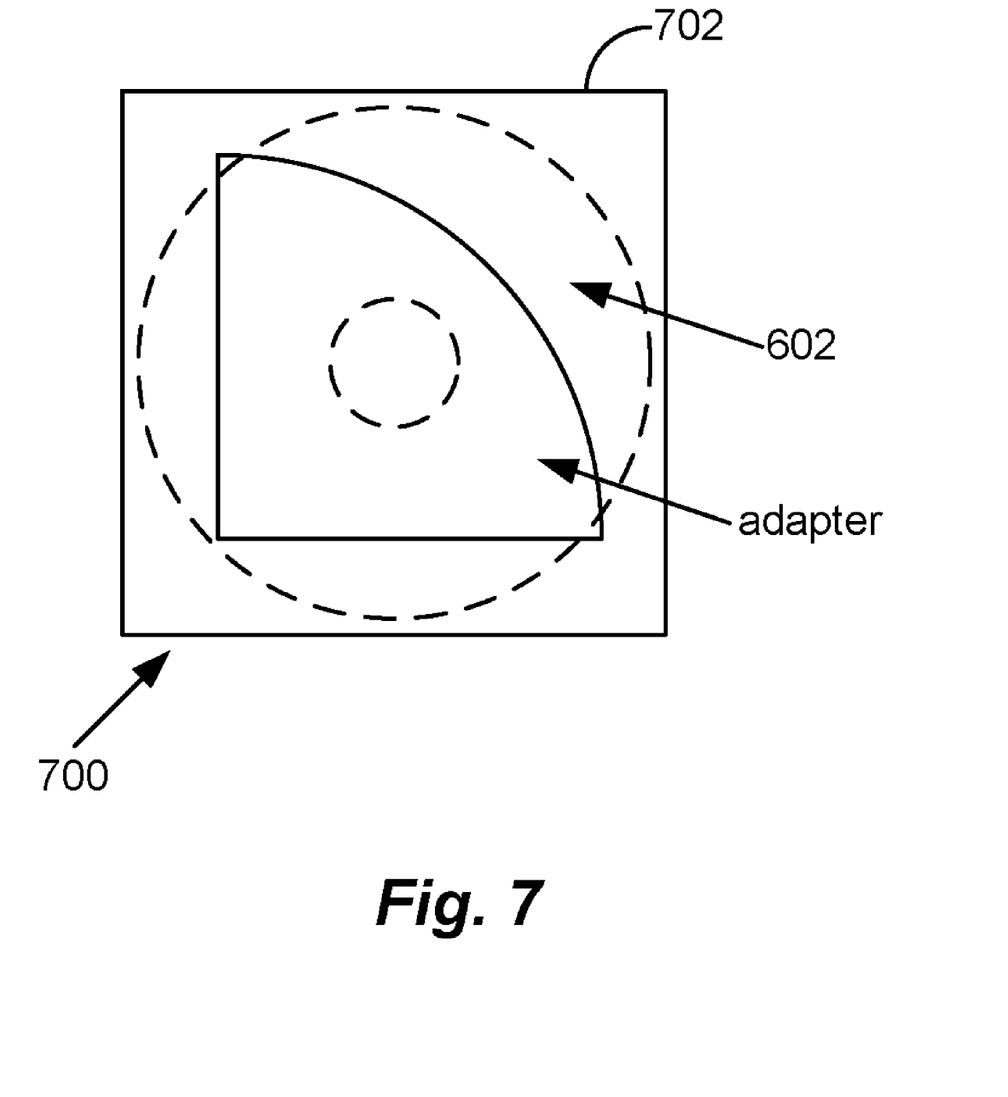
FIG. 7 shows a container containing both the reduced diameter disc and the compacted memory disc adapter.

FIG. 7 shows an assembly 700 in accordance with an embodiment of the invention. The assembly 700 includes a container 702 having a size commensurate with the disc 602 suitable for shipping both the reduced diameter disc 602 and the compacted memory disc adapter together. In the embodiment shown in FIG. 7, the memory disc adapter is configured so as to fit within the footprint of the container 702.

Figure 8:
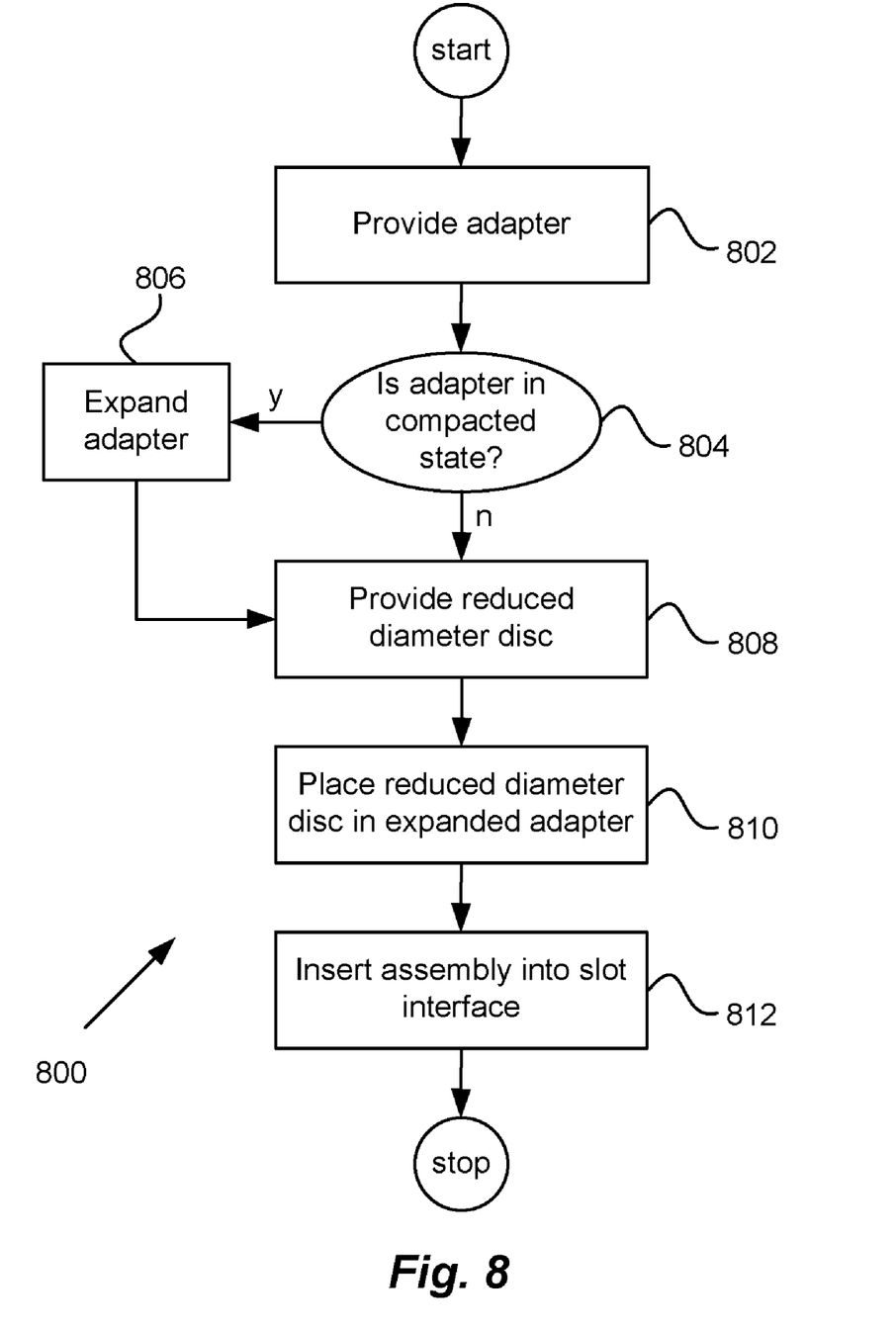
FIG. 8 shows a flowchart illustrating a process of using the memory disc adapter to play the reduced diameter disc in a memory disc player designed exclusively for a standard diameter disc.

FIG. 8 shows a flowchart illustrating a process 800 of using the memory disc adapter to play a reduced diameter disc in a memory disc player in accordance with an embodiment of the invention. The process 800 begins at 802 by providing the compacted memory disc adapter. At 804 it is determined whether or not the adapter is in the compacted configuration. If the adapter is in the compacted configuration, the adapter is expanded at 806. In any case, a reduced diameter disc is provided at 808. At 810 the reduced diameter disc is placed into a central region of the expanded adapter thus forming an assembly suitable for insertion into a standard sized slot interface.

Figure 9:
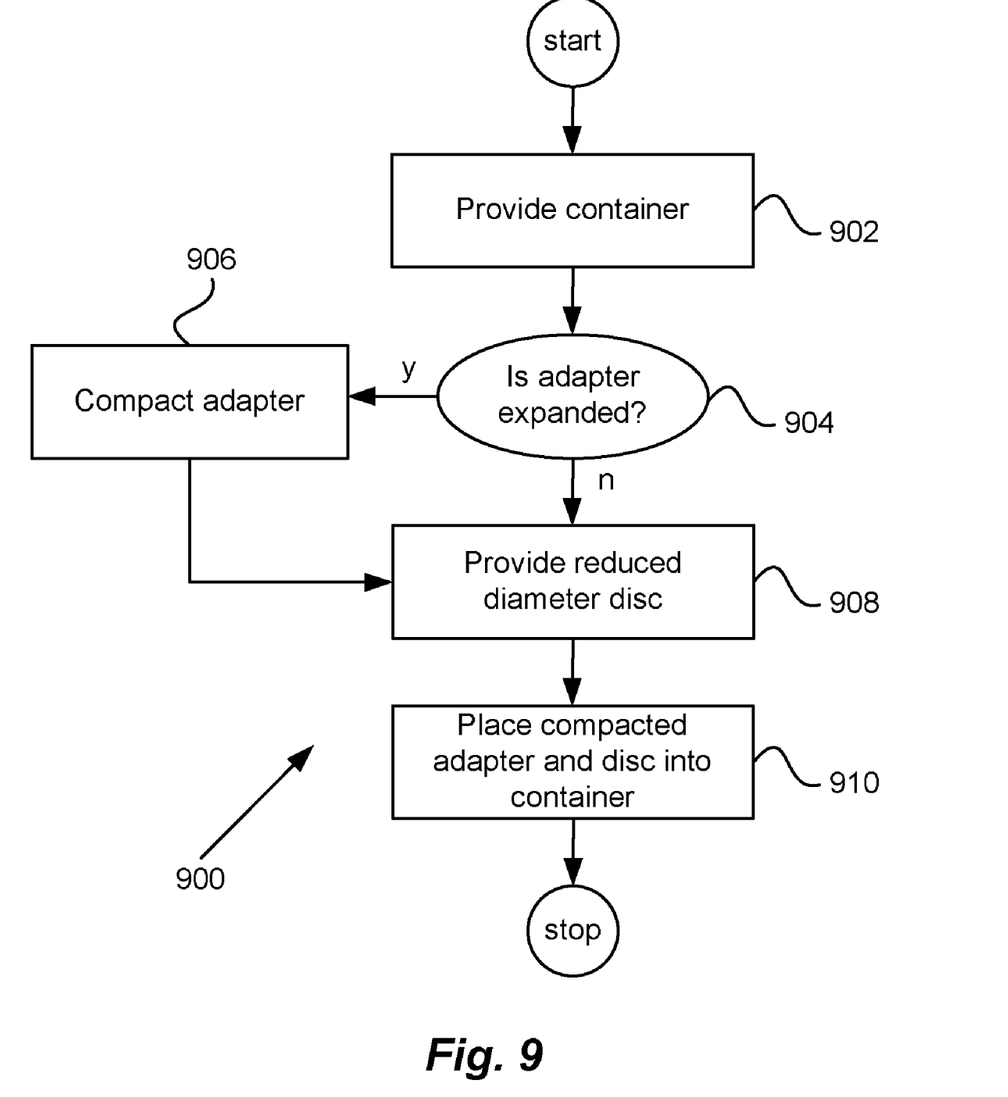
FIG. 9 shows a flowchart illustrating a process of assembling a shipping assembly in accordance with an embodiment of the invention.

FIG. 9 shows a flowchart illustrating a process 900 of forming a shipping assembly in accordance with an embodiment of the invention. The process 900 begins at 902 by providing a container having a size commensurate with a reduced diameter disc. At 904 it is determined whether or not the memory disc adapter is in the expanded configuration. If the adapter is in the expanded configuration, the adapter is compacted at 906. In any case, a reduced diameter disc is provided at 908. At 910 the reduced diameter disc and compacted memory disc adapter are placed within the container.

Figure 10:
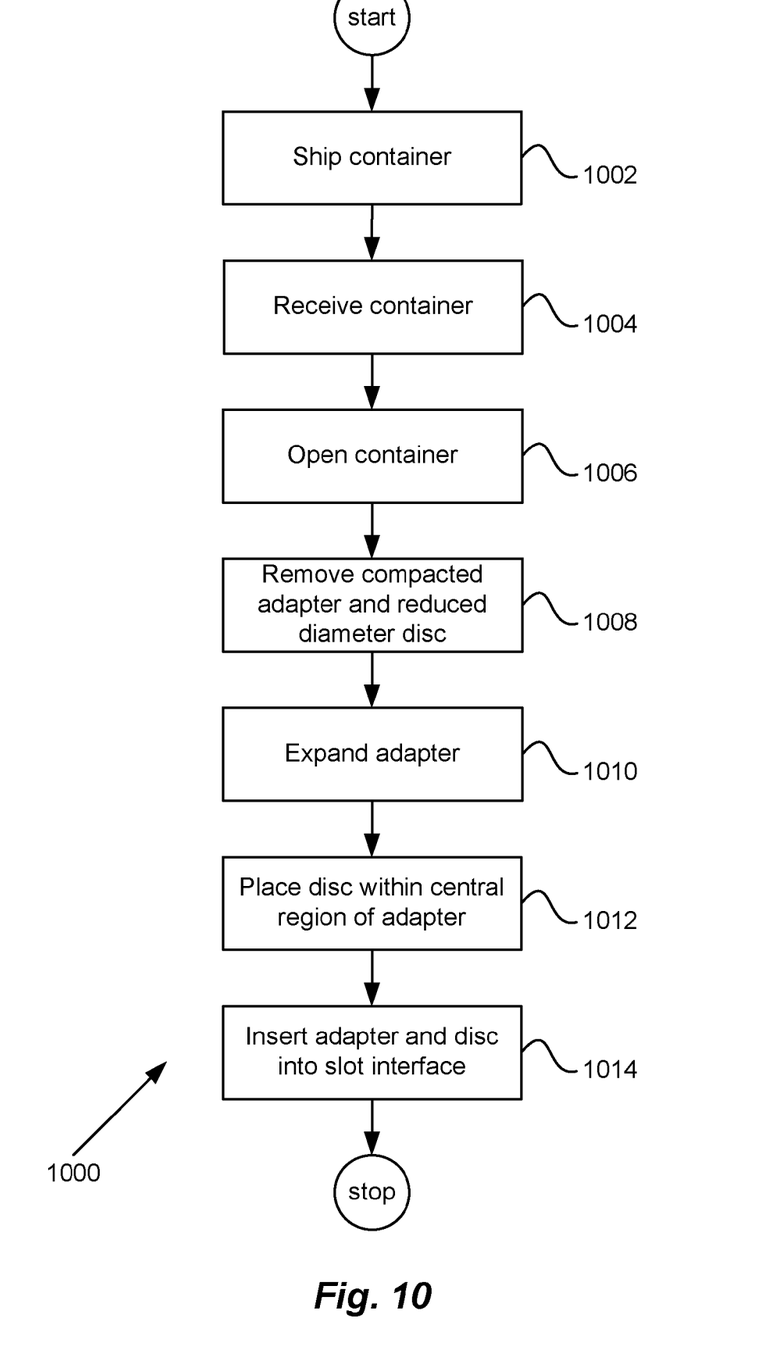
FIG. 10 shows a flowchart illustrating a process of shipping the assembly described by FIG. 7 and the subsequent usage of the assembly by a user.

FIG. 10 shows a flowchart illustrating a process 1000 for shipping the assembly described by FIG. 7 and the subsequent receipt and usage of the assembly by a user. At 1002, the assembly formed by process 900 is shipped. At 1004, the user receives the assembly and at 1006, the user opens the container. At 1008, the user removes the compacted adapter and reduced diameter disc from the container. At 1010, the compacted adapter is expanded. As described above, this expansion can either be automatic or manual. Once expanded, the reduced diameter disc within the central region of the adapter at 1012. Finally, at 1014 the user inserts the adapter and reduced diameter disc into the slot interface of the memory disc player.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

What is claimed is:

1. A compactable memory disc adapter having an expanded state that can be used to play a reduced diameter memory disc in a slot drive designed exclusively for a standard diameter disc, and having a compacted state that provides a footprint commensurate with a reduced diameter disc footprint, the compactable memory disc adapter comprising a plurality of segments that fit together to form the adapter, wherein the plurality of segments are telescoping segments that comprise sliding overlapping segments and wherein a segment can be telescopically extended from an immediately adjacent section.

2. A compactable memory disc adapter as recited in claim 1, wherein at least two of the segments each include a portion of a locking mechanism arranged to lock the telescoped segments together.

3. A compactable memory disc adapter as recited in claim 2, wherein the locking mechanism comprises:
   a tab receiver; and
   a tab that when inserted into the tab receiver locks the respective segments together.

4. A compactable memory disc adapter as recited in claim 1 wherein the compacted adapter can be placed atop the reduced diameter disc such that a resulting footprint is less than a standard diameter disc footprint.

5. A compactable memory disc adapter as recited in claim 1 further comprising a packaging assembly formed by placing the compacted adapter atop the reduced diameter disc having a packaging assembly footprint that is commensurate with a reduced diameter disc footprint.

6. A compactable memory disc adapter as recited in claim 5 further comprising a shipping assembly comprising:
   a container having a size commensurate with the packaging assembly wherein the packaging assembly is placed within the container.

7. A compactable memory disc adapter as recited in claim 1 wherein the standard diameter is 12 cm and wherein the reduced diameter is 8 cm.

8. A compactable disc adapter, comprising:
   a substrate capable of effectively extending the diameter of a disc, the substrate comprising a plurality of telescoping segments that fit together to form the adapter, wherein the plurality of segments are telescoping segments comprise sliding overlapping segments, and wherein a segment can be telescopically extended from an immediately adjacent section;
   wherein said substrate has a compacted position and an extended position,
   wherein, in the compacted position, said substrate is compacted such that its diameter is less than the diameter of the disc, and
   wherein, in the extended position, said substrate is expanded such that its diameter is greater than the diameter of the disc.

9. An adapter as recited in claim 8 wherein the diameter of the disc is 8 cm and wherein in the extended position, the diameter is 12 cm.

10. An adapter as recited in claim 9, wherein the disc and said substrate in the extended position effectively cooperate so as to be usable in a disc drive designed to receive only a 12 cm disc.

11. An adapter as recited in claim 8, wherein the substrate comprises a plurality of portions coupled together via joints.

12. An adapter as recited in claim 8, wherein at least two of the segments each include a portion of a locking mechanism arranged to lock the telescoped segments together.

13. An adapter as recited in claim 12, wherein the locking mechanism comprises:
   a tab receiver; and
   a tab that when inserted into the tab receiver locks the respective segments together.

14. An adapter as recited in claim 8, wherein the telescoping segments comprise sliding overlapping segments.

15. An adapter as recited in claim 14, wherein a segment can be telescopically extended from an immediately adjacent section.

16. A compactable memory disc adapter having a compacted state and an expanded state that can be used to play a reduced diameter memory disc in a slot drive designed for a standard diameter disc, comprising a plurality of telescoping segments that fit together to form the adapter, wherein the plurality of telescoping segments comprise a plurality of sliding overlapping segments, and wherein a segment can be telescopically extended from an immediately adjacent section.

17. An adapter as recited in claim 16, wherein the reduced diameter memory disc can be rigidly connected to the adapter.

18. An adapter as recited in claim 16, wherein the adapter can be compacted to fit within a container having a size commensurate with the reduced diameter memory disc.

19. An adapter as recited in claim 16, wherein the adapter has a diameter of about 12 cm.

20. An adapter as recited in claim 16, wherein the adapter has an annular configuration in its expanded state.

21. An adapter as recited in claim 16, wherein a portion can be telescopically extended from an immediately adjacent portion.

22. An adapter as recited in claim 16, wherein at least two of the sliding overlapping portions each include a portion of a locking mechanism arranged to lock the sliding overlapping portions together.

23. An adapter as recited in claim 22, wherein the locking mechanism comprises:
   a tab receiver; and
   a tab that when inserted into the tab receiver locks the respective sliding overlapping portions together.

* * * * *